United States Patent
Giering et al.

(10) Patent No.: US 6,444,948 B1
(45) Date of Patent: Sep. 3, 2002

(54) FINE AND MICRO-MACHINING PROCESS FOR WORKPIECES BY MEANS OF LASER BEAMS

(75) Inventors: Axel Giering, Stuttgart; Peter Linden, Beimerstetten; Markus Beck, Ulm; Jochen Bahnmüller, Wendlingent, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/529,334
(22) PCT Filed: Sep. 15, 1998
(86) PCT No.: PCT/EP98/05836
§ 371 (c)(1), (2), (4) Date: Jun. 1, 2000
(87) PCT Pub. No.: WO99/19108
PCT Pub. Date: Apr. 22, 1999

(30) Foreign Application Priority Data

Oct. 15, 1997 (DE) .......................................... 197 45 280

(51) Int. Cl.[7] ............................................. B23K 26/36
(52) U.S. Cl. ................................................. 219/121.73
(58) Field of Search ...................... 219/121.68, 121.69, 219/121.7, 121.71, 121.72, 121.78, 121.79, 121.8, 121.81, 121.73

(56) References Cited

U.S. PATENT DOCUMENTS

| 4,822,974 A | | 4/1989 | Leighton | |
|---|---|---|---|---|
| 5,093,549 A | | 3/1992 | Iwai et al. | |
| 5,284,477 A | * | 2/1994 | Hanna et al. | 219/121.8 |
| 5,632,083 A | * | 5/1997 | Tada et al. | 219/121.68 |
| 5,645,740 A | * | 7/1997 | Naiman et al. | 219/121.68 |

FOREIGN PATENT DOCUMENTS

| DE | 32 17 226 A1 | 12/1982 | B23K/26/06 |
|---|---|---|---|
| DE | 295 15 897 U1 | 2/1996 | F21P/3/00 |
| GB | 2 227 965 A | 8/1990 | B23K/26/06 |

OTHER PUBLICATIONS

Vaughan, William; Dove Prisms Properties and Problems; In: Optical Spectra; Oct. 1981, p. 68.

* cited by examiner

Primary Examiner—Samuel M. Heinrich
(74) Attorney, Agent, or Firm—Pendorf & Cutliff (57) ABSTRACT

A process and device are disclosed for fine and micro-machining workpieces by means of laser beams. The process is conducted in several stages and the device has a modular design. The process and device make it possible to generate highly uniform cut seams or grooves, to set the required conicity, to work in a highly accurate and reproducible manner and give a great freedom of design during machining.

20 Claims, 6 Drawing Sheets

FINE AND MICRO-MACHINING PROCESS FOR WORKPIECES BY MEANS OF LASER BEAMS

BACKGROUND OF THE INVENTION

1. Field of the Invention

The invention concerns a process for fine and micro-machining of workpieces using laser beams as well as a device for carrying out the process. This type of process and device has already been proposed.

2. Description of the Related Arts

The fine and micro-machining of workpieces using laser beams, in particular laser drilling and laser ablation, is employed for example for production of function-optimized fine drilling or for forming three-dimensional surface structures. A non-exhaustive list of possible applications includes for example:

- cooling holes and in certain cases form bore holes in turbine blades,
- perforations of thin sheet metal, for example, for boundary layer suction removal,
- lubrication bore holes in motors and transmissions,
- spray openings in injector nozzles,
- precision cuts in materials which are difficult to mill,
- micro-structures in sliding and rolling surfaces.

Essential for the qualitatively high value of the fine and micro-machining of workpieces by means of laser beams is above all a good as possible precision of dimension and shape, a precise as possible reproducibility and a low as possible follow-up processing expenditure.

These requirements are only unsatisfactorily accomplished by the known processes and devices.

In U.S. Pat. No. 5,632,083 a method and an apparatus are described for fabricating a lead frame. In the apparatus the workpiece is irradiated with a laser beam. The apparatus includes a device for focusing the laser beam, a device for rotating the laser beam about the beam axis, and a device for variation of the point of impact of the laser beam on the workpiece.

Besides this there exist for example processes and devices, in which the laser beam is guided for example by means of a Trepanier optic system. A disadvantage thereof is the limited possibility of the shaped defined thereby; only round bore holes or structures are possible. A defined conicity of the bores or structures cannot be selected.

In other known processes and devices, the workpiece is moved by means of an x-y-table or, in another variant, also by means of a robot. The disadvantage therein is that the workpiece must be moved, and it has been found in practice that the track precision of the workpiece movement is worse than that of a guided laser beam and as a consequence the size and shape precision of the laser processing is comparatively poor.

In other known processes and devices, the deflection of the laser beam occurs exclusively by means of an x-y-scanner. A disadvantage therein is that the path precision has been found to be worse and the size and shape stability of the laser processing resulting therefrom is comparatively poor. Beyond this, it is not possible to provide a defined conicity of the bore or structure.

In other previously known processes and devices, the deflection of the laser beam occurs by means of a moveable robot-guided cutting optic. A disadvantage therein is that, here also, as has been found in practice that there is a lower path precision, and the therefrom resulting size and shape precision of the laser processing is comparatively poorer.

Beyond this, in all the above-discussed processes and devices an asymmetric intensity distribution of the laser beam results in the production of asymmetric cut seams.

SUMMARY OF THE INVENTION

The task of the present invention is comprised therein, of providing a process and a device for fine and micro-machining of workpieces by means of laser beams, which partially or completely

- produces cut seams or notches with substantially equivalent dimensional shapes,
- permits a substantially free selection of shape during processing,
- makes possible an adjustment of the desired conicity,
- works with high precision and reproducibility.

The invention provides a process and device are disclosed for fine and micro-machining workpieces by means of laser beams. The process is conducted in several stages and the device has a modular design. The process and device make it possible to generate highly uniform cut seams or grooves, to set the required conicity, to work in a highly accurate and reproducible manner and give a great freedom of design during machining.

With respect to the process for fine and micro-processing of workpieces by means of laser beams, the task is inventively solved thereby,

- that the laser beam is guided through three modules prior to reaching the workpiece, and thereby
- that in the first module the laser beam is rotated about its beam axis, and
- that by means of the second module the impact point of the laser beam upon the work piece is varied, and
- that by means of the third module the incident angle of the laser beam relative to the surface of the workpiece is varied.

The task is inventively solved, with respect to the device for fine and micro-machining of workpieces by means of laser beams, thereby,

- that the device is comprised of three modules,
- of which the first contains a device for rotation of the laser beam about its transmission axis, and
- the second contains a device for variation of the point of impact of the laser beam upon the workpiece, and
- the third contains a device for variation of the incident angle of the laser beam relative to the surface of the workpiece.

The advantage of such a construct of the process and device is comprised therein, that by the rotation of the laser beam about its rotation axis a variation in the intensity distribution and/or an unround focusing can be compensated for, and therewith an even cut seam results during the processing of the workpiece, and therein, that the variation of the point of impact of the laser beam makes possible a wide as possible unrestricted selection of the shape during processing, and therein, that the variation of the incident angle of the laser beam makes possible an adjustment or selection of a desired conicity.

In an advantageous embodiment of the invention concerning the device for fine and micro-machining of workpieces by means of laser beams, the module for rotation of the laser beams contains one or more prisms, which receive the optical beam axis and cause an image rotation, preferably a Dove-, Abbe-, or King prism, as well as a device for rotation thereof or the prism about a rotation axis, and a device for controlling a defined rotational speed of the rotation.

The advantage of this design is comprised therein, that the laser beam can be homogenized with respect to its cross-sectional geometry and/or intensity (time averaged) and this without influencing the impact point or the impact angle of the laser beam on the workpiece, and without reducing the quality of the form-producing processing.

In an advantageous embodiment of the invention concerning the device for fine and micro-machining of workpieces by means of laser beams, the module for variation of the impact point of the laser beam includes a mirror, as well as a device for rotation of the mirror about at least two independent rotation axis, preferably perpendicular rotation axes, whereby the device for rotation of the mirrors preferably includes piezo actuators.

The advantage of this design is comprised therein, that with it the laser beam can be deflected in such a manner, that the production of highly precise and reproducible workpiece geometries is made possible, in particular also the production of rotation asymmetric geometries or the ablation of three-dimensional structures on the workpiece outer surface. The perpendicular arrangement of the rotation axis simplifies the setting up of defined deflections of the laser beam. The piezo actuators make possible the achievement of an optimal precision.

In another advantageous embodiment of the invention concerning the device for fine and micro-machining of workpieces by means of laser beams, the module for variation of the impact point of the laser beam contains multiple mirrors or other deflection devices, as well as devices for rotation of the mirror about at least two independent rotation axes, preferably perpendicular rotation axis, wherein preferably respectively one mirror is rotated about respectively one rotation axis, and wherein the devices for rotation of the mirror preferably include piezo actuators.

The advantage of this design corresponds to that of the embodiment described immediately above.

In an advantageous embodiment of the invention concerning the device for fine and micro-machining of workpieces by means of laser beams, the module for variation of the impact angle of the laser beam includes a device for rotation of the overall module about the beam axis of the incident beam, a device fixed within the module for deflection of the incident laser beam in the plane perpendicular to the incident beam direction, preferably containing multiple fixed mirrors or a fixed prism, as well as a further device for deflection of the laser beam, which is moveable within the module, preferably in the form of a mirror or a prism, as well as a device for translation of this moveable deflection device along the broadcast direction of the laser beam emitted from the fixed deflection device, as well as a device for tilting of the moveable deflection device about at least one further axis.

The advantage of this design is comprised therein, that by the rotation of the complete module circular bore holes can be produced, and therein, that by the translation and the tipping or tilting of the moveable deflection device it becomes possible to select any desired radius of the bore and any desired inclination or cone angle of the bore.

In a further advantageous embodiment of the invention concerning the device for fine and micro-machining of workpieces by means of laser beams, the module for variation of the impact angle of the laser beam contains a device for deflection of the laser beam in two independent directions (x-y-deflection), preferably released in the form of two independent scanner-mirrors, as well as two associated devices for rotation of the scanner-mirrors about two independent axis, preferably about two axis oriented perpendicularly to each other.

The advantage of this design is comprised therein, that thereby also circular bore holes with adjustable radius and adjustable conicity can be produced. The difference with respect to the first-described variant is comprised therein, that the first can be employed for extremely fine bore holes in the micrometer realm, while the second permits the working of substantially larger geometries and angles.

In a further advantageous embodiment of the invention concerning the device for fine and micro-machining of workpieces by means of laser beams, there is situated between the second module for variation of the impact point of the laser beam and the third module for variation of the impact angle of the laser beam a further deflection device, preferably in the form of a mirror.

The advantage of such a deflection is in the possibility of changing the work plane, for example, from a vertical processing of the workpiece to a horizontal processing.

DETAILED DESCRIPTION OF THE INVENTION

Figure 1:
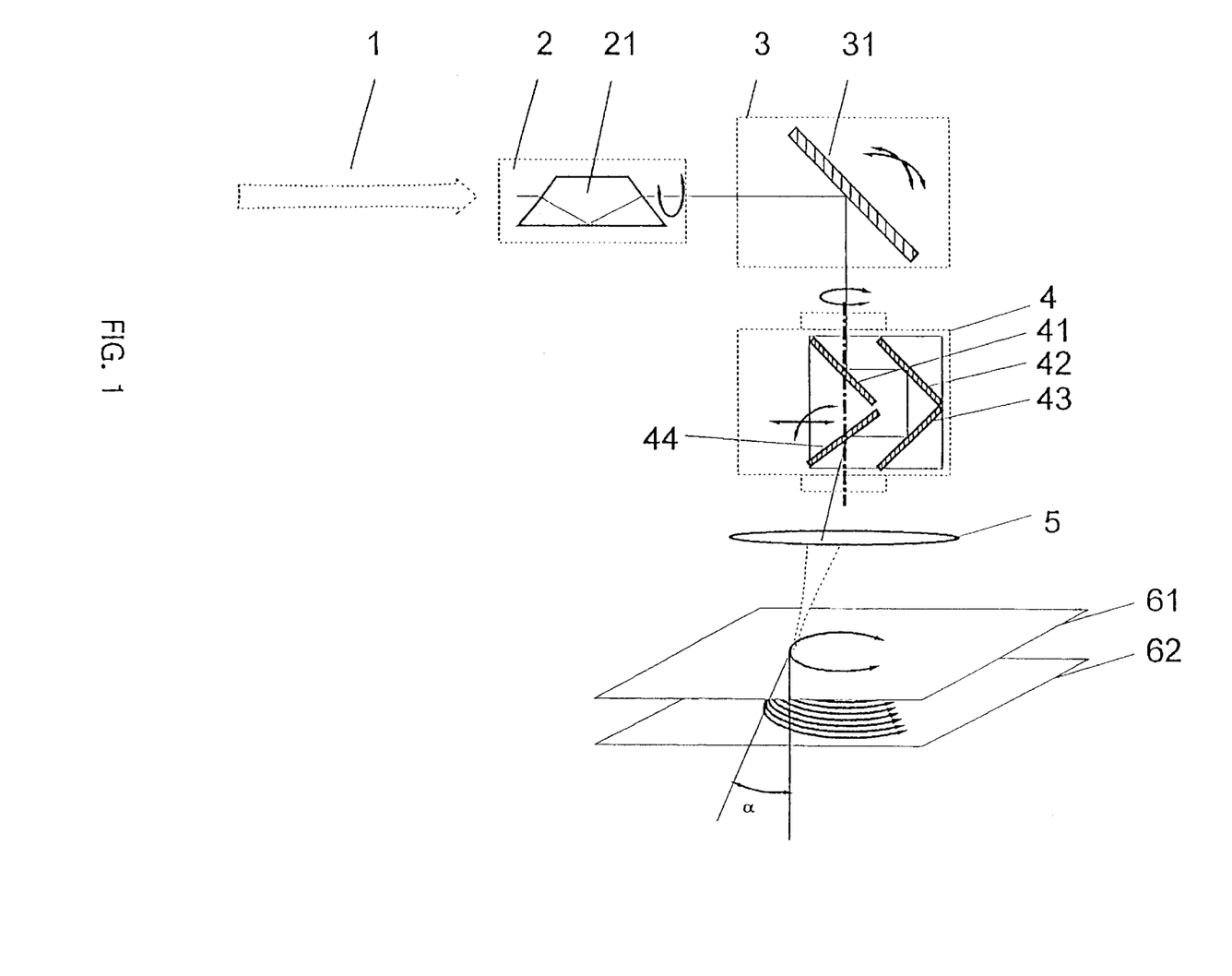
FIG. 1 shows a first embodiment of the invention.

In the following the inventive process and the inventive device for fine and micro-machining of workpieces by means of a laser beam is described in greater detail on the basis of examples and figures:

A first exemplary embodiment of the device is shown in FIG. 1. This makes possible the production of larger inclination angles up into the size range of 30 degrees. According to FIG. 1, the laser beam 1 is first directed to the first module 2 for rotation of the laser beam about its beam axis. The module 2 contains a device 21 for rotation of the laser beam about its beam axis, here realized in the form of a Dove-prism rotatable with an adjustable rotation speed. As a result of this rotation, the laser beam is homogenized with respect to its cross-sectional geometry and/or intensity (time average), and this without influencing the impact point or the impact angle of the laser beam upon the workpiece and without lowering the quality of the consequential production of the shape producing machining.

After its homogenization, the laser beam 1 is directed to the module 3 for variation of the impact point of the laser beam upon the workpiece. The module 3 is realized in the form of a mirror 31, as well as a device for rotation of the mirror about two perpendicular rotation axes, whereby the device for rotation of the mirror is driven by piezo actuators. Via this module 3 the laser beam 1 can be directed to the workpiece 6 in such a manner that the production of highly precise and reproducible workpiece geometries is made possible, in particular also the production of rotation asymmetric geometries or the ablation of three-dimensional structures on the workpiece surface. The perpendicular orientation of the rotation axis simplifies the adjustment or setting of defined deflections of the laser beam. The piezo actuators make possible an attainment of a high dynamic movement with optimal precision.

Subsequently, the laser beam 1 is directed to the module 4. This module serves above all for production of round bore holes with adjustable conicity. The module 4 is constructed in the manner that the laser beam 1 first is deflected about 90 degrees by a mirror 41 fixed within the module 4 and is directed to a second mirror 42 fixed within the module 4. There the laser beam 1 is again deflected about 90 degrees and directed to a third mirror 43 provided fixed within the module 4, and there again deflected about 90 degrees and directed to a fourth mirror 44. This mirror 44 is moveable within the module 4 and more specifically translative in the propagation direction of the laser beam 1 incident thereupon and tiltable in two further directions. The entire module 4 is rotatable about the beam axis of the incident laser beam. The axis of the incident and the emitted laser beam are, as a rule, different. By the rotation of the overall module 4 round bore holes can be produced, by the translation and the tilting of the moveable mirror 44 any desired radius of the bore can be set or selected as well as any desired inclination or cone angle of the bore.

Subsequently, the laser beam 1 is directed through image optic 5, here realized in the form of a flat field lens 51, by means of which the required processing focus is produced.

Thereafter the laser beam 1 impacts with inclination angle α on the upper surface 61 of the workpiece 6.

Figure 2:
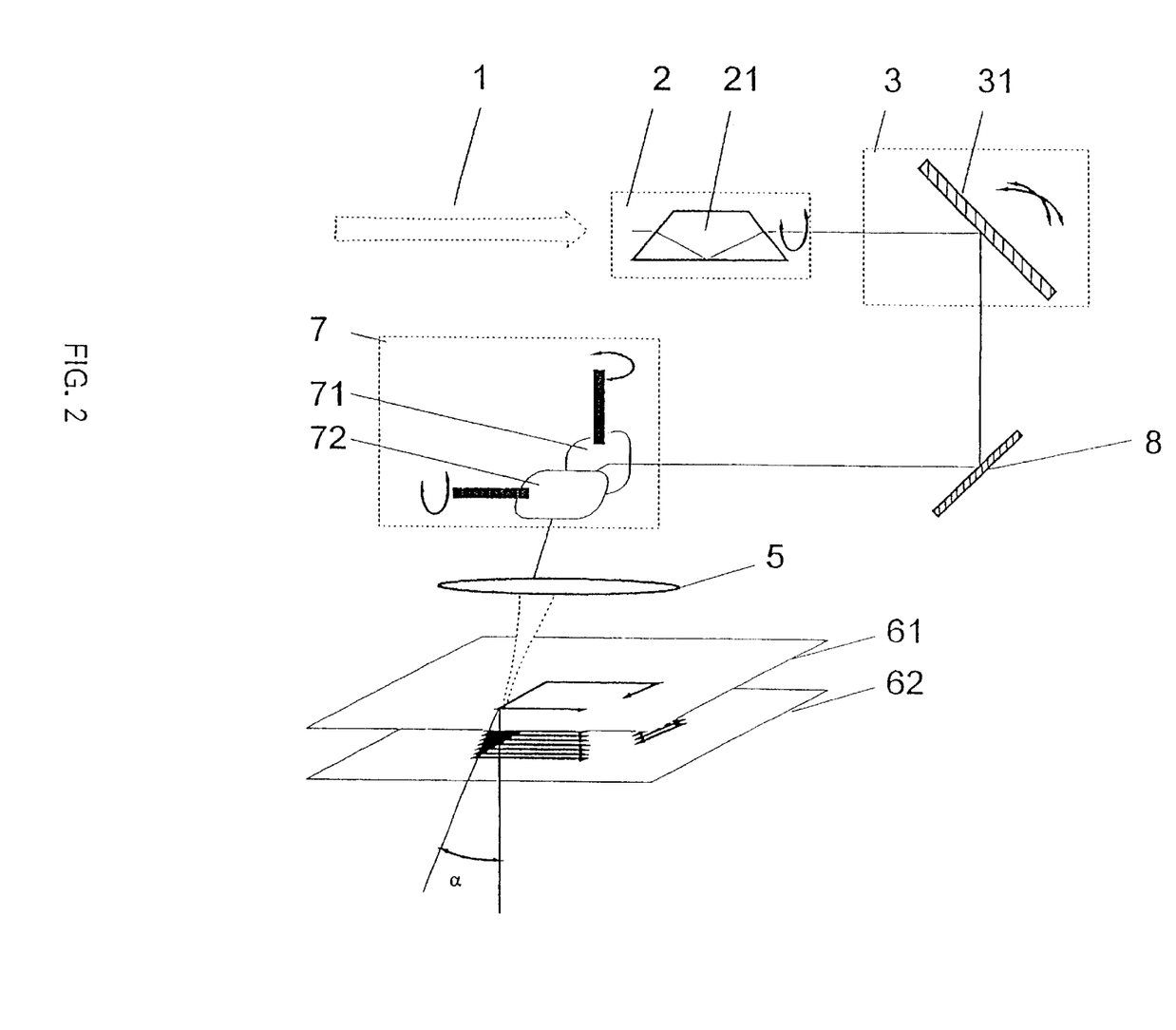
FIG. 2 shows a second embodiment of the invention.
Figure 3:
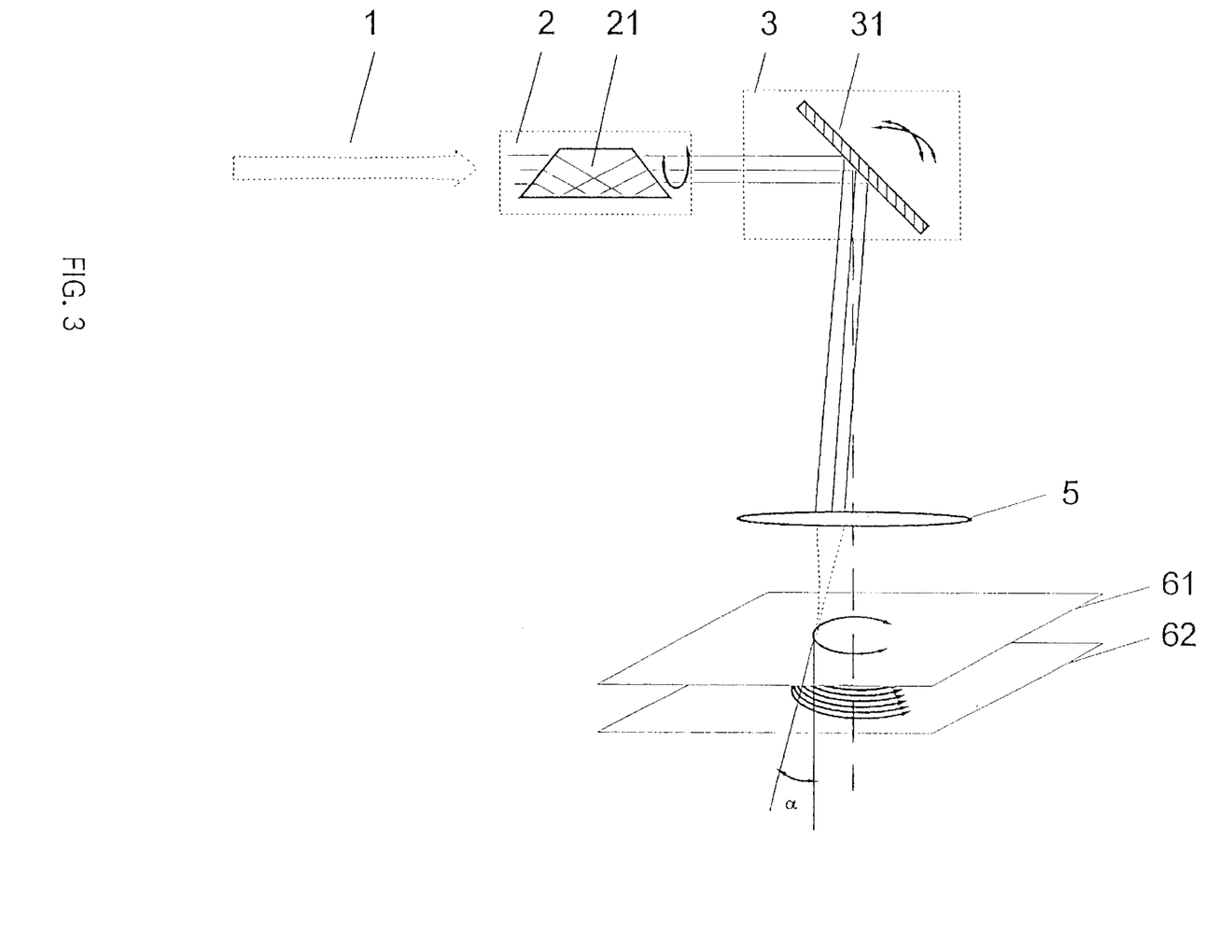
FIG. 3 shows a third embodiment of the invention omitting the third module.

A second exemplary embodiment of the device is shown in FIG. 2. The modules 2 and 3 are constructed analogously to FIG. 1 and operate in the same way. Module 4 for variation of the impact angle of the laser beam 1 is replaced with module 7.

Between the modules 3 and 7, there is an optional deflection mirror 8. This makes possible a change in the machining plane, for example from a vertical machining of the workpiece to a horizontal machining.

Module 7 includes a device for deflection of the laser beam in two independent directions (x-y-deflection) in the form of two independent scanner-mirrors 71 and 72, as well as two associated devices for rotation of the scanner-mirrors 71 and 72 about two axis, here oriented perpendicular to each other. As a result of appropriate rotation of the scanner-mirrors 71 and 72, it becomes possible also to produce circular bores with adjustable radius and adjustable conicity. The difference with respect to the first-described variant by means of module 4 is comprised therein, that the first is employed for extremely small bores with micro-meter range, while the second can be employed for substantially larger geometries and tilt angles. Beyond this, it is possible herewith to produce any desired geometry, not only radially symmetric bore holes. Compare FIG. 2.

The deflection of the laser beam 1 via a module 4 or 7 must be coordinated with the deflection of the laser beam 1 via a module 3.

Subsequently, the laser beam 1 also in this illustrative example is directed through an imaging optic, here realized in the shape of a flat field lens 51, by means of which the necessary machining focus is produced, and the laser beam thereafter strikes the upper surface 61 of the workpiece 6 with the inclination angle α.

The inventive processes inclusive of devices have demonstrated themselves in the described embodiments as particularly suited for laser drilling and laser ablation in the production of function optimized fine drilling or the production of three-dimensional outer surface structures. In particular they have been found suited for the following applications:

cooling or form bore holes in turbine blades, perforation of thin sheet metal, for example for boundary layer vacuum removal, lubrication bore holes in motors and transmission parts, spray openings in injector nozzles, precision cutting in materials difficult to mill, micro-structures in sliding and rolling surfaces.

The invention is not limited only to the above-described embodiments, but rather is open to other variations.

Figure 4:
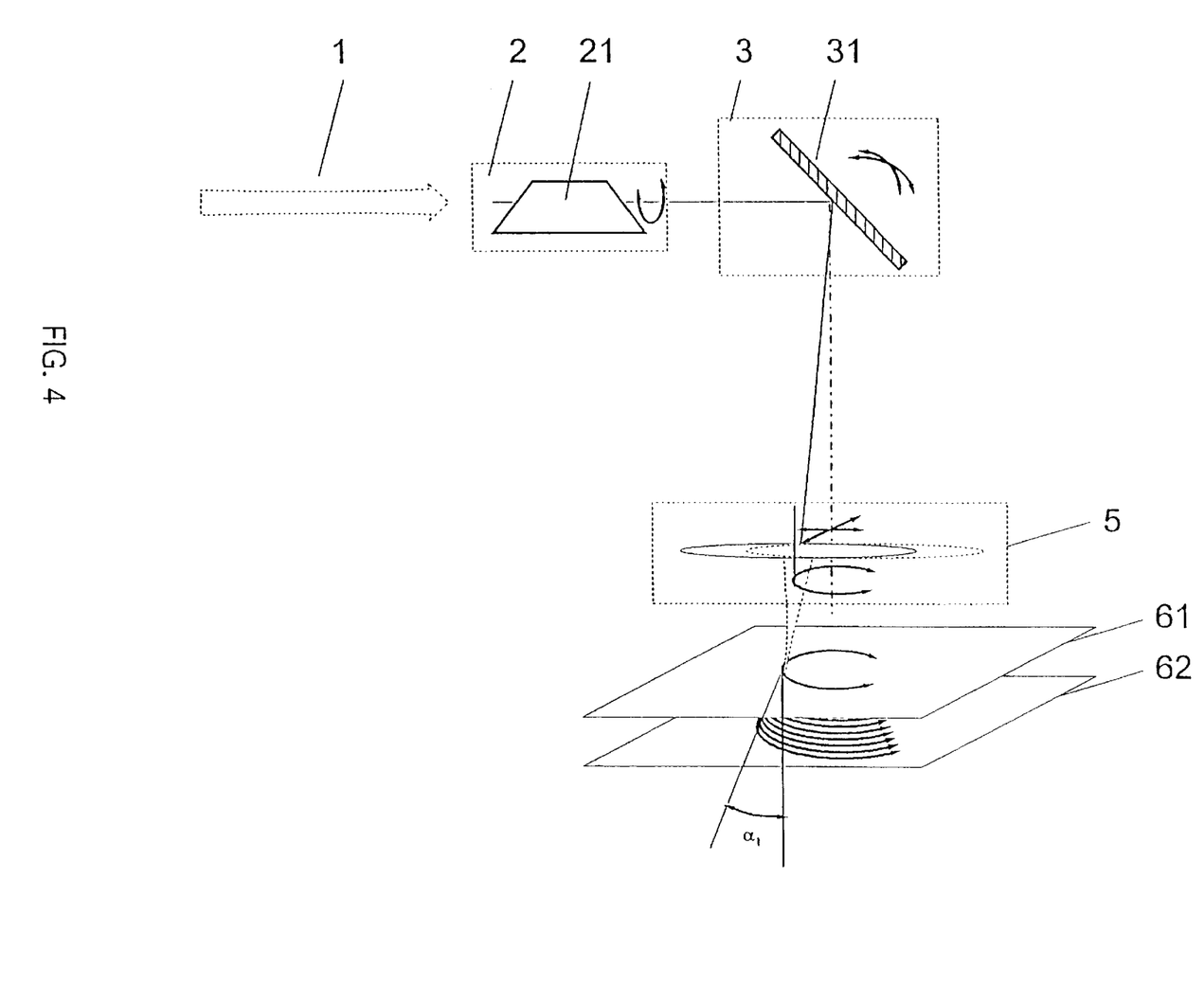
FIG. 4 shows a fourth embodiment of the invention.

So it is possible for example to completely omit the third module and in place thereof to utilize an imaging optic 5 with appropriate characteristics, for example in the form of a lens or a lens system with suitable imaging imperfections. The conicity can then be selected by the incorporation of such desired lens imperfections and the variation of the distance or separation of module 2 to the imaging optic 5. Compare to this the embodiment shown in FIG. 4. Better adjustment possibilities result from a supplemental translational movement (for example, cross-wise) and/or eccentric rotation movement of the imaging optic 5. Compare to this the illustrative embodiment represented in FIG. 4.

Besides this, it is possible to connect the focusing imaging optic 5 with module 4 or 7, for example in the form of at least one hollow mirror or at least one holographic optic element (HOE).

Further, in place of the x-y-scanner-mirror pair, it is also possible to employ a G-scanner.

Figure 5:
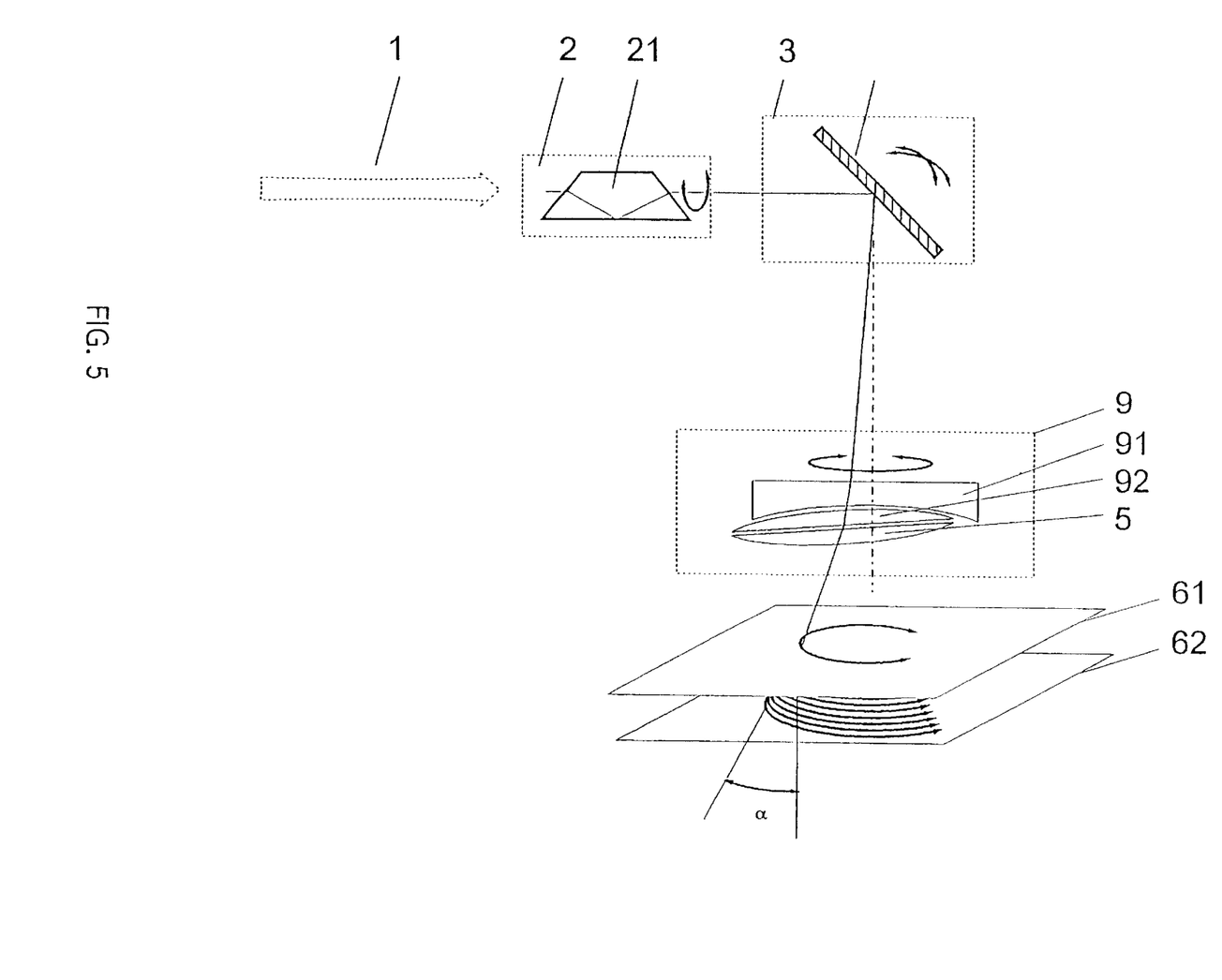
FIG. 5 shows a fifth embodiment of the invention with different Terpanier optic.
Figure 6:
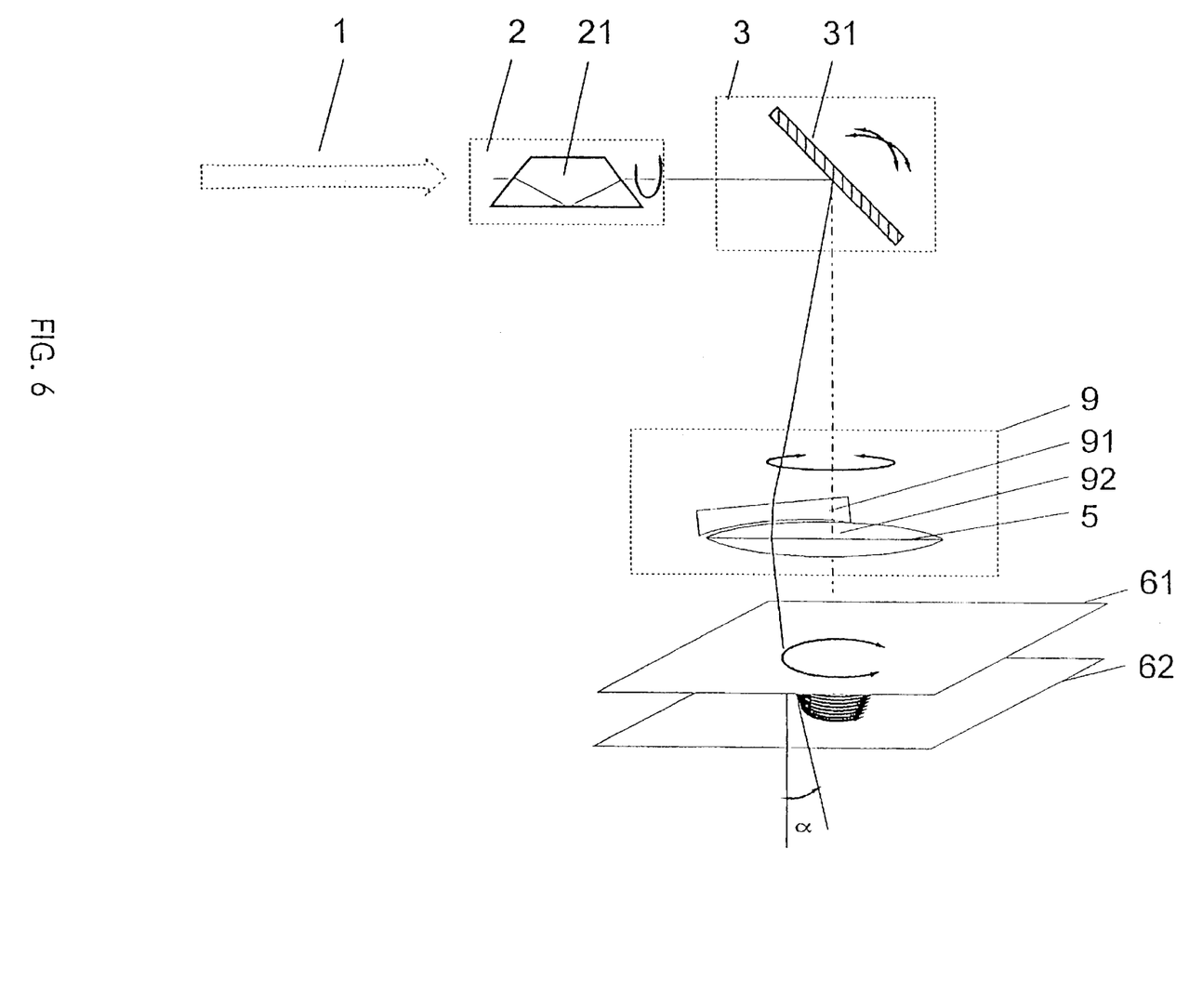
FIG. 6 shows a sixth embodiment of the invention with alternative arrangement of the imaging optic.

Further, the third module can employ, in place of the embodiments 4 or 7, as shown in FIG. 5 employ in element 9 a different Trepanier optic, which follows the principle of a rotating wedge or key plate but with variable prism angle. The elements 91 and 92 represent a variable prism (prism angle) and are here connected with the imaging optic 5 and are moved together. 5 and 92 can be combined. 5 and 92 can be a holographic optic element. The total module 9 rotates about a neutral center axis (dashed line in FIG. 5). In a different variant (shown in FIG. 6), the imaging optic 5 is moved along with 91 and 92, but however does not rotate along with the entire module 9.

Besides this, it is possible to combine respectively two or three modules into a combined unit.

What is claimed is:

1. A device for fine and micro-machining of workpieces by means of laser beams, which includes a device for focusing of laser beams, which contains multiple modules, which modules include a module for rotation of the laser beam about its beam axis, a module for varying the impact point of the laser beam upon the workpiece, and containing one or more mirrors as well as a device associated with each mirror for rotation of the mirror about at least two independent rotation axes, and a module which contains a device for variation of the incident angle of the laser beam relative to the surface of the workpiece.

2. A device for fine and micro-machining of workpieces by means of laser beams, which includes a device for focusing of laser beams, which contains multiple modules, which modules include a module for rotation of the laser beam about its beam axis, a module for varying the impact point of the laser beam upon the workpiece, and a module which contains a device for variation of the incident angle of the laser beam relative to the surface of the workpiece.

3. A device according to claim 2, wherein the module which contains a device for variation of the incident angle of the laser beam relative to the surface of the workpiece is provided subsequent to module which contains a device for varying the impact point of the laser beam upon the workpiece.

4. A device according to claim 2, wherein the module for rotation of the laser beam contains one or more prisms which receive the optical beam axis and bring about an image rotation, as well as a device for rotation of the prism or prisms about the beam axis and a device for achieving a defined speed of rotation.

5. A device according to claim 2, wherein the module for variation of the impact point of the laser beam contains a mirror, as well as a device for rotation of the mirror about at least two independent rotation axes.

6. A device according to claim 2, wherein the module for variation of the impact point of the laser beam contains multiple mirrors, as well as devices for rotation of the mirrors about at least two independent rotation axes.

7. A device according to claim 3, wherein the module for variation of the impact angle of the laser beam contains a device for rotation of the entire module about the beam axis of the incident beam, as well as a device fixed within the module for deflection of the incident laser beam in the plane perpendicular to the incident beam direction, as well as a further device for deflection of the laser beam, which within the module is moveable, as well as a device for translation of this moveable deflection device along the propagation or broadcast direction of the laser beam radiated out of the fixed deflection device, as well as a device for tilting of the moveable deflection device about at least one further axis.

8. A device according to claim 7, wherein the device for translation and/or tilting of the moveable deflection device contains piezo actuators.

9. A device according to claim 3, wherein the module for variation of the impingement angle of the laser beam contains a device for deflection of the laser beam in two independent directions (x-y-deflection), as well as two associated devices for rotation of the scanner-mirrors about two independent axes.

10. A device according to claim 3, wherein between the second module for variation of the impact point of the laser beam and the third module for variation of the impingement angle of the laser beam a further deflection device is situated.

11. A process for fine and micro-machining of workpieces by means of laser beams, comprising generating a laser beam, focusing the laser beam, striking the workpiece with said focused laser beam, wherein the laser beam prior to striking the workpiece is directed through first, second and third modules, wherein in the first module the laser beam is rotated about a beam axis, wherein in the second module the point of impact of the laser beam on the workpiece is varied, and wherein in the third module the impact angle of the laser beam relative to the surface of the workpiece is varied.

12. A device according to claim 4, wherein said prisms are selected from the group consisting of Dove, Abbe, and King prisms.

13. A device according to claim 5, wherein said at least two independent rotation axes are perpendicular rotation axes.

14. A device according to claim 5, wherein for the rotation of the mirrors the device contains piezo actuators.

15. A device according to claim 6, wherein said at least two independent rotation axes are perpendicular axes.

16. A device according to claim 6, wherein the devices for rotation of the mirror contain piezo actuators.

17. A device according to claim 7, wherein the device fixed within the module for deflection of the incident laser beam in the plane perpendicular to the incident beam direction contains multiple fixed mirrors or a fixed prism.

18. A device according to claim 7, wherein the further device for deflection of the laser beam, which is moveable within the module, is in the form of a mirror or a prism.

19. A device according to claim 9, wherein the device for deflection of the laser beam in two independent directions (x-y-deflection) comprises two independent scanner-mirrors.

20. A device according to claim 9, wherein the two a associated devices for rotation of the scanner-mirrors about two independent axes are for rotation about two axes oriented perpendicularly to each other.

* * * * *